(12) United States Patent
Mahesh et al.

(10) Patent No.: US 11,055,189 B2
(45) Date of Patent: *Jul. 6, 2021

(54) REPLACEABLE MEMORY

(71) Applicant: Micron Technology, Inc., Boise, ID (US)

(72) Inventors: Ananda C. S. Mahesh, Cedar Park, TX (US); Gregory P. Shogan, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,936

(22) Filed: Oct. 15, 2019

(65) Prior Publication Data

US 2020/0042414 A1 Feb. 6, 2020

Related U.S. Application Data

(63) Continuation of application No. 15/671,774, filed on Aug. 8, 2017, now Pat. No. 10,489,257.

(51) Int. Cl.
*G06F 11/00* (2006.01)
*G06F 11/20* (2006.01)
*G06F 11/16* (2006.01)

(52) U.S. Cl.
CPC ...... *G06F 11/2094* (2013.01); *G06F 11/1662* (2013.01); *G06F 11/2017* (2013.01); *G06F 11/2092* (2013.01); *G06F 2201/805* (2013.01)

(58) Field of Classification Search
CPC ............. G06F 11/2017; G06F 11/2056; G06F 11/2071; G06F 11/2074; G06F 11/2076; G06F 11/2079; G06F 11/2087; G06F 11/2089; G06F 11/2092
USPC .............................................. 714/6.21, 1–57
See application file for complete search history.

(56) References Cited

U.S. PATENT DOCUMENTS

| 6,058,039 | A | 5/2000 | Abe et al. |
| 7,293,138 | B1 * | 11/2007 | Mahmoud ........... G06F 11/1076 711/104 |
| 7,865,761 | B1 | 1/2011 | Chilton |
| 8,020,035 | B2 | 9/2011 | Voigt et al. |

(Continued)

FOREIGN PATENT DOCUMENTS

| CN | 102332302 A | 1/2012 |
| CN | 104137184 A | 11/2014 |

OTHER PUBLICATIONS

International Search Report and Written Opinion from related international application No. PCT/US2018/045572, dated Jan. 10, 2019, 16 pages.

(Continued)

*Primary Examiner* — Sarai E Butler
(74) *Attorney, Agent, or Firm* — Brooks, Cameron & Huebsch, PLLC

(57) ABSTRACT

The present disclosure includes apparatuses comprising replaceable memory. An example apparatus may include a controller and a memory package coupled to the controller and including a plurality of memory dies. At least one of the memory package and the controller may be a replaceable unit that is removable from the apparatus and replaceable with a different replaceable unit while maintaining operation of the apparatus.

20 Claims, 3 Drawing Sheets

(56) References Cited

U.S. PATENT DOCUMENTS

| | | | |
|---|---|---|---|
| 8,060,774 B2* | 11/2011 | Smith | G11C 7/1012 |
| | | | 714/6.22 |
| 9,128,662 B2 | 9/2015 | Kim et al. | |
| 2005/0028068 A1* | 2/2005 | Larson | G06F 11/326 |
| | | | 714/764 |
| 2009/0248765 A1* | 10/2009 | Akidau | G06F 11/004 |
| 2010/0146180 A1* | 6/2010 | Takahashi | G06F 13/4022 |
| | | | 710/302 |
| 2011/0035548 A1 | 2/2011 | Kimmel et al. | |
| 2012/0079306 A1* | 3/2012 | Jayakumar | G06F 11/3062 |
| | | | 713/340 |
| 2013/0054873 A1 | 2/2013 | Belluomini et al. | |
| 2014/0192583 A1* | 7/2014 | Rajan | G11C 5/06 |
| | | | 365/63 |
| 2014/0195859 A1 | 7/2014 | Dickenson et al. | |
| 2014/0245097 A1* | 8/2014 | Larsen | G11C 29/52 |
| | | | 714/755 |
| 2015/0106660 A1* | 4/2015 | Chumbalkar | G06F 11/328 |
| | | | 714/42 |
| 2015/0116861 A1 | 4/2015 | Sorenson, III et al. | |
| 2015/0143032 A1 | 5/2015 | Hashimoto | |
| 2016/0065000 A1* | 3/2016 | Maeda | G11C 5/148 |
| | | | 307/23 |
| 2016/0070623 A1* | 3/2016 | Derk | G06F 11/1469 |
| | | | 714/6.23 |
| 2016/0071604 A1 | 3/2016 | Kurita et al. | |
| 2016/0110105 A1 | 4/2016 | Karamcheti et al. | |
| 2016/0306768 A1 | 10/2016 | Mataya | |
| 2016/0378582 A1* | 12/2016 | Choi | G06F 11/0727 |
| | | | 714/37 |
| 2019/0037713 A1 | 1/2019 | Zhai | |

OTHER PUBLICATIONS

Preliminary Rejection from related Korean Patent Application No. 10-2020-7004669, dated Jun. 4, 2020, 8 pages.
First Office Action from related Chinese Patent Application No. 201880051479.8, dated Jul. 8, 2020, 9 pages.
European Search Report from related European Patent Application No. 18843862.6, dated Apr. 12, 2021, 6 pages.

* cited by examiner

# REPLACEABLE MEMORY

PRIORITY INFORMATION

This application is a continuation of U.S. application Ser. No. 15/671,774, filed on Aug. 8, 2017, the contents of which are incorporated herein by reference.

TECHNICAL FIELD

The present disclosure relates generally to semiconductor memory, and more particularly, to replaceable memory.

BACKGROUND

Memory devices are typically provided as internal, semiconductor, integrated circuits in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be utilized as volatile and non-volatile memory for a wide range of electronic applications in need of high memory densities, high reliability, and low power consumption. Non-volatile memory may be used in, for example, personal computers, portable memory sticks, solid state drives (SSDs), personal digital assistants (PDAs), digital cameras, cellular telephones, portable music players, for example, MP3 players, and movie players, among other electronic devices. Data, such as program code, user data, and/or system data, such as a basic input/output system (BIOS), are typically stored in non-volatile memory devices.

Memory devices may include various memory components, and a failure of one or more of the memory components often leads to a replacement of the memory devices. Also, various memory components are not replaceable while maintaining device operation (e.g., without powering down the system).

DETAILED DESCRIPTION

Figure 1:
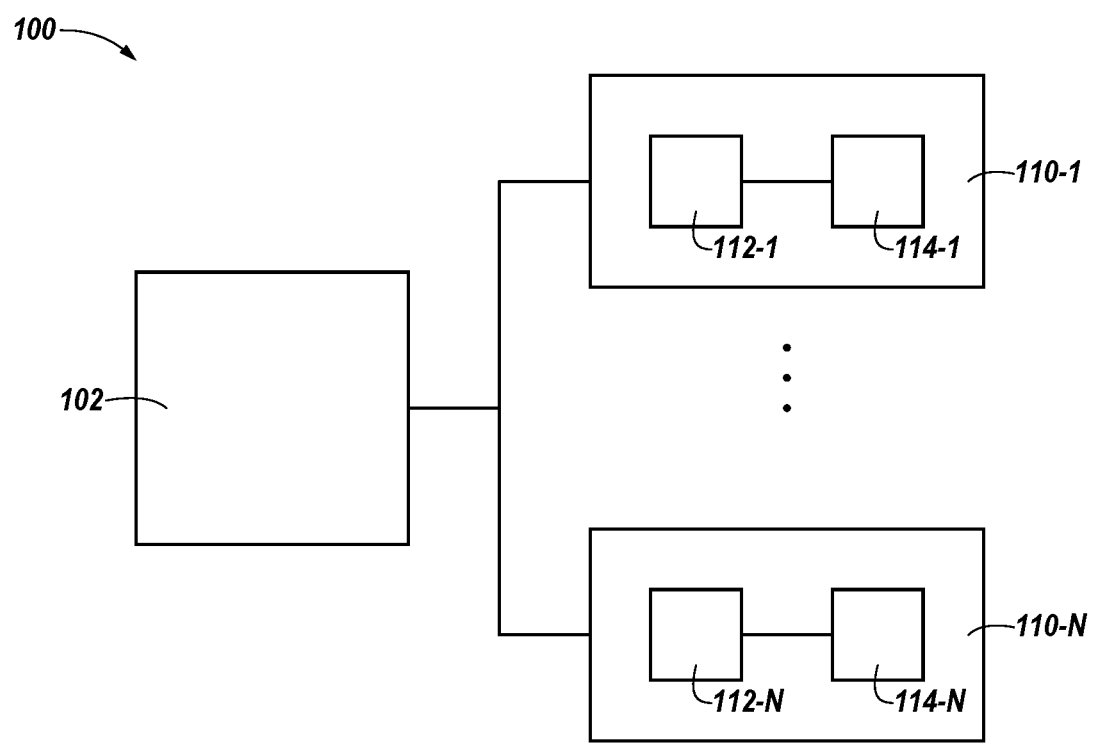
FIG. 1 is a block diagram of an apparatus comprising a memory system including a replaceable unit in accordance with a number of embodiments of the present disclosure.

The present disclosure includes apparatuses comprising replaceable memory. An example apparatus may include a controller and a memory package coupled to the controller and including a plurality of memory dies. At least one of the memory package and the controller may be a replaceable unit that is removable from the apparatus and replaceable with a different replaceable unit while maintaining operation of the apparatus.

Embodiments of the present disclosure may provide benefits such as reducing the need to replace a memory device (e.g., an SSD) due to a failure of one or more components (e.g., a controller, memory package, memory die, power supply, etc.). For example, in some previous approaches, an SSD, which may include several memory packages (e.g., chips) and/or several memory dies, would be treated as a single point of failure (SPOF). As such, a mere failure of one package, for instance, might result in replacement of an entire SSD. In some previous approaches, a memory system comprising multiple SSDs may still be used despite failure of one or more of the SSDS; however, such approaches may significantly reduce capacity, performance, and reliability the system. For example, consider a system comprising multiple SSDs each with a capacity of 8 terabytes (TB) or more. In such a case, even a failure of a single SSD component (e.g., package) may impose a significant burden should such a failure result in a need to replace the SSD itself. For instance, not only would capacity of the system be reduced, but the operating burden on the remaining non-failed SSDs of the system would be increased. In some previous approaches, a particular memory component (e.g., a DRAM chip) may not be replaceable without shutting down the system; thereby, disrupting operation of the system.

In contrast, a number of embodiments of the present disclosure can include apparatuses that include various memory components as replaceable units such that the apparatus does not include a SPOF for the various constituent components. For example, in various embodiments, the constituent components (e.g., controller, package, dies, etc.) can be replaced while maintaining operation of the system (e.g., without powering down the system).

As used herein, a replaceable unit may be a field-replaceable unit. For example, the replaceable unit may include a memory component (e.g., memory package) that may be easily removable and replaceable even by a person lacking an in-depth knowledge of a memory system and/or the constituent memory components. For example, a replaceable unit might include a NAND package that can be replaced "in the field" without removing an entire sub-assembly or module (e.g., SSD) from a system and/or without powering down the system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M", particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of" something (e.g., a number of memory cells) can refer to one or more of such things, whereas a "plurality of" is intended to refer to more than one of such things (e.g., more than one memory cell). Furthermore, the words "can" and "may" are used throughout this application in a permissive sense (e.g., having the potential to, being able to), not in a mandatory sense (e.g., required to).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

FIG. 1 is a block diagram of an apparatus in the form of a computing system 100 including a host 102 and a number of memory systems 110-1, . . . , 110-N including a replaceable unit in accordance with a number of embodiments of the present disclosure. The systems 110-1, . . . , 110-N can be referred to collectively as memory systems 110. The computing system 100 may be a data center or a server system, although embodiments are not so limited.

The host 102 may be a host system such as a personal laptop computer, a desktop computer, a digital camera, a mobile telephone, or a memory card reader, a storage controller, a storage system, among various other types of hosts that have an access to and control over the memory systems 110. The host 102 may include a system motherboard and/or backplane and may include a number of memory access devices (e.g., a number of processors).

The memory systems 110 may be solid state drives (SSDs), for example, and may include a number of controllers 112-1, . . . , 112-N and a number of memory packages 114-1, . . . , 114-N. As used herein, the memory systems 110, controllers 112, and/or memory packages 114 may also be separately considered as an "apparatus." In a number of embodiments, the memory systems 110 may be a storage module that includes a plurality of non-volatile packages (e.g., packages comprising NAND flash memory, phase change memory, and/or RRAM) and at least one DRAM package (e.g., including dies of DRAM cells), for example, as a memory buffer. The non-volatile packages may be storage class memory (SCM); however, embodiments are not limited to a particular type of non-volatile package.

The memory packages 114 may serve as a storage volume for the system 100. The memory package 114 may include a plurality of memory dies (e.g., 2, 4, 8, and/or 16 memory dies). The constituent dies of a package 114 can be NAND dies and/or DRAM dies, among various other die types. In a number of embodiments, the memory package 114 and/or the controller 112 of a given system 110 may be a replaceable unit that is removable from an apparatus (e.g., computing system 110) and replaceable with a different replaceable unit while maintaining operation of the apparatus.

The computing system 100 may include an interface by which the host 102 can access the memory systems 110. The interface may be, for example, a serial advanced technology attachment (SATA), peripheral component interconnect express (PCIe), or a universal serial bus (USB), among other connectors and interfaces, which may be compliant with various interface protocols such as non-volatile memory express (NVMe) including NVMe over Fabrics (NVMeoF). In general, the host 102 and the memory systems 110 are coupled to each other via an interface having compatible receptors for passing control, address, data, and other signals.

The controller 112 may be coupled to the memory packages 114 via a memory interface (not shown in FIG. 1). The memory interface may support various standards and/or comply with various interface types such as open NAND flash interface (ONFI) specification.

The controller 112 may be one of a plurality of controllers of each one of the memory systems. The controller 112 may communicate with the memory packages 114 to control data read, write, and erase operations, among other operations. In a number of embodiments, each one of the controllers 112 is a replaceable unit such that, subsequent to a failure of one or more of the plurality of controllers, a non-failed one of the plurality of controllers is configured to continue serving the memory package such that the operation of the apparatus is maintained despite the failure.

The memory package 114 may be one of a plurality of memory packages of the memory systems 110. In a number of embodiments, each one of the plurality of memory packages is a replaceable unit such that, subsequent to a failure of one or more of the plurality of memory packages, the one or more of the plurality of memory packages is replaced to maintain a same number of non-failed memory packages despite the failure. Accordingly, the packages 114 and/or controllers 112 are replaceable such that the systems 110 are not a SPOF. In a number of embodiments, data stored in the plurality of memory packages may be protected via a variety of data protection schemes including RAIN (redundant array of independent nodes), RAID (redundant array of independent disks), and/or ECC (error correction coding).

Figure 2:
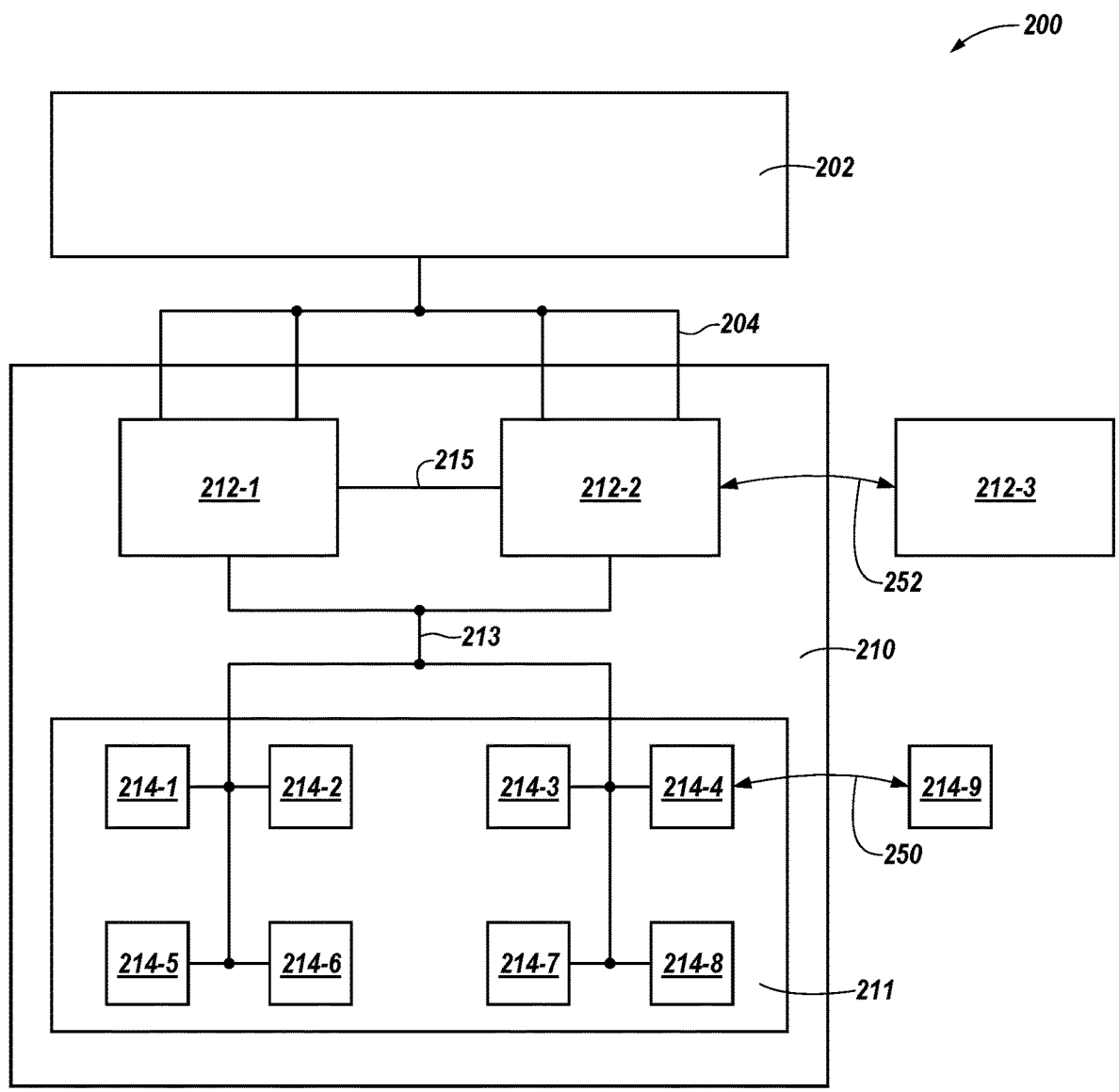
FIG. 2 illustrates an example of an apparatus comprising a memory system including a replaceable unit in accordance with a number of embodiments of the present disclosure.

FIG. 2 illustrates an example of an apparatus in the form of a computing system 200 including a replaceable unit in accordance with a number of embodiments of the present disclosure. The computing system 200 includes a host 202 and a memory system 210. The host 202 and the memory system 210 may be analogous to host 102 and memory system 110 described in connection with FIG. 1. In a number of embodiments, the memory system 210 is one of a plurality of memory systems coupled to the host 202.

The host 202 is coupled to the memory system 210 via a bus 204, for example, which may be compliant with an interface protocol such as the NVMe including the NVMeoF.

In a number of embodiments, a data protection scheme such as the RAID, RAIN, and/or ECC may be provided by the host 202. For example, when a plurality of memory systems are coupled to the host 202, the host 202 may protect data across the plurality of memory systems 210 via a RAID scheme. Further, the host 202 protect data across the memory packages 214 within a system 210 via RAIN and/or EC.

As shown in FIG. 2, the memory system 210 may include a plurality of controllers 212-1 and 212-2 (e.g., referred to collectively as controllers 212) and a plurality of memory packages 214-1, 214-2, 214-3, 214-4, 214-5, 214-6, 214-7, and 214-8 (e.g., referred to collectively as memory packages 214) coupled to the controllers 212. In a number of embodiments, at least one of the memory packages 214 may include a plurality of memory dies.

In a number of embodiments, the controllers 212 may be coupled to the plurality of memory packages via a bus 213. In some embodiments, the bus 213 may be ONFI compliant bus. Further, the controllers 212 may be configured to protect data stored on the plurality of memory packages by providing at least one of RAIN and EC.

In a number of embodiments, the controllers 212 are coupled to each other via an inter-controller messaging bus 215. As such, either or both controllers 212-1 and 212-2 can serve memory system 210.

In a number of embodiments, the memory packages 214 may be non-volatile memory (NVM) packages that may include non-volatile memory cells. For example, at least one of the memory packages 214 may be a NAND package.

In a number of embodiments, the memory system 210 may include one or more system board 211 (e.g., a PCB) on which the memory packages 214 are implemented. An example of multiple system boards is illustrated in FIG. 3.

In a number of embodiments, at least one of the memory packages 214 is a replaceable unit that is removable from the memory system 210 and replaceable with a different package 214 while maintaining operation of the memory system 210. In some embodiments, one or more of the memory packages 214 may be replaced as a replaceable unit responsive to a failure of the one or more of the memory packages 214. For example, in FIG. 2, memory package 214-4 represents a failed package being replaced (e.g., as shown by arrow 250) with a different memory package 214-9. Data stored in the failed memory package 214-4 may be restored via RAID, RAIN, and/or ECC provided by the controllers 212 and/or the host 202. Subsequent to the replacement, the data previously stored in the failed memory package 214-4 may be rewritten to the replacement memory package 214-9.

In a number of embodiments, at least one of the controllers 212 is a replaceable unit that is removable from the memory system 210 and replaceable with a different replaceable unit while maintaining operation of the memory system 210. In some embodiments, responsive to a failure of one of the controllers 212, the failed one of the controllers 212 may be replaced with a different replaceable unit, and a non-failed one of the controllers 212 may be configured to continue serving the memory packages 214 such that the operation is maintained despite the failure. For example, in FIG. 2, controller 212-2 represents a failed controller being replaced (e.g., as shown by arrow 252) with a different controller 212-3. Until replacement of controller 212-2, controller 212-1 may continue serving the memory packages 214 instead of the controller 212-2. As such, a sole failure of the controller 212-2 may not be the SPOF of the memory system 210 as compared to previous approaches, in which a controller 212 of a memory system may be the SPOF.

Figure 3:
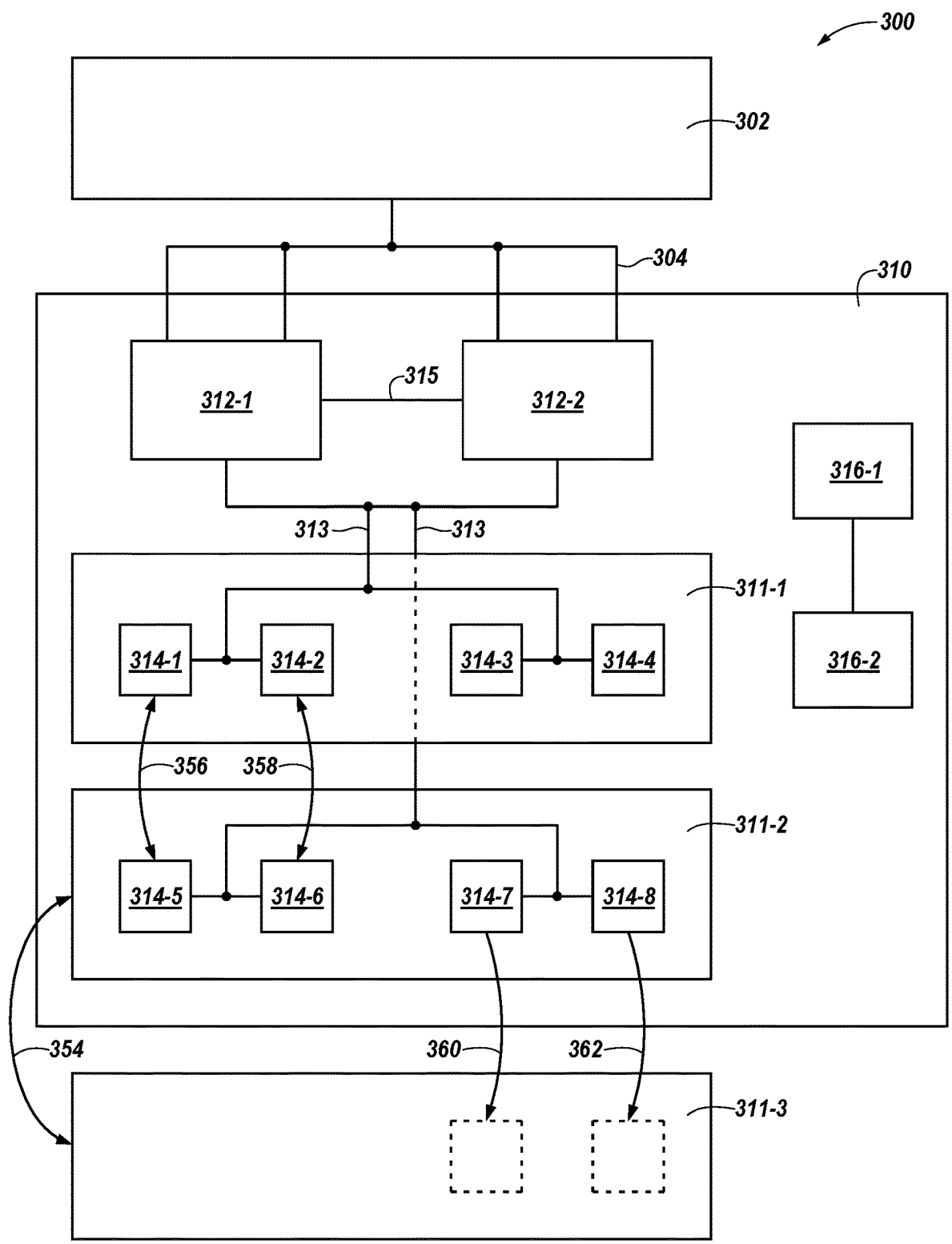
FIG. 3 illustrates an example of an apparatus comprising a memory system including a replaceable unit in accordance with a number of embodiments of the present disclosure.

FIG. 3 illustrates an example of an apparatus in the form of a computing system 300 including a replaceable unit in accordance with a number of embodiments of the present disclosure. The computing system 300 may include a host 302 and a memory system 310. The memory system 310 includes a plurality of controllers 312-1 and 312-2 (e.g., referred to collectively as controllers 312), a plurality of system boards 311-1 and 311-2 (e.g., referred to collectively as system boards 311) coupled to the controllers 312. The host 302 may be coupled to the memory system 310, for example, via a bus 304 (e.g., PCIe that is compliant with the NVMe and/or NVMeoF interface), and the controllers 312 may be coupled to the memory packages 314, for example, via a bus 313 such as a ONFI compliant bus. A plurality of controllers 312 may be coupled to one another via a bus 315 such as an inter-controller messaging bus.

In a number of embodiments, controllers 312 are coupled to the host 302 and the host 302 may be configured to control the controllers 312 protect data across the system boards 311 such that data stored in a failed one of the plurality of system boards are restorable. For example, the host 302 may protect data across the system boards 311 via a RAID scheme.

As shown in FIG. 3, the system boards 311 include a plurality of memory packages 314-1, 314-2, 314-3, 314-4, 314-5, 314-6, 314-7, and 314-8 (e.g., referred to collectively as memory packages 314). For example, the system board 311-1 may include memory packages 314-1, 314-2, 314-3, and 314-4, and the system board 311-2 may include memory packages 314-5, 314-6, 314-7, and 314-8.

In a number of embodiments, at least one of the plurality of system boards 311, at least one of the controllers 312, and at least one of the memory packages 314 is a replaceable unit that is removable from the memory system 310 and replaceable with a different replaceable unit while maintaining operation of the memory system 310. In some embodiments, the replaceable unit is removable from the memory system 310 and replaceable with a different replaceable unit responsive to a failure of the replaceable unit such that, subsequent to a replacement of the failed replaceable unit, the memory system 310 is operable along with the different replaceable unit. For example, in FIG. 3, system board 311-2 represents a failed system board being replaced (e.g., as shown by arrow 354) with a different system board 311-3.

In a number of embodiments, a non-failed memory package located on a failed one of the system boards 311 is reusable on a non-failed one of the plurality of system boards. For example, memory packages 314-5 and 314-6 represent non-failed packages located on a failed system board 311-2 and being replaced (e.g., as shown by arrows 356 and 358) with the memory packages 314-1 and 314-2 that represent failed packages and located on the non-failed system board 311-1. As another example, memory packages 314-7 and 314-8 represent non-failed memory packages located on the failed system board 311-2 and being implemented (e.g., as shown by arrows 360 and 362) in the system board 311-3 that is to be replaced with the failed system board 311-2.

In a number of embodiments, the memory system 310 may include a plurality of power supplies 316-1 and 316-2. At least one of the plurality of power supplies 316 may be a replaceable unit that is removable from the memory system 310 and replaceable with a different replaceable unit. Implementing the plurality of power supplies provides benefits such as maintaining the operation of the memory system 310 until a replacement of, for example, a failed replaceable unit of the memory system 310. For example, responsive to a failure of the power supplies 316-1, the non-failed power supplies 316-2 may be configured to continue serving (e.g., supplying the power to the memory system 310) the memory system 310 to provide the power supply despite the failure.

In a number of embodiments, the memory system 310 may include at least two replaceable units for each component. For example, the memory system 310 may include two power supplies 316, as shown in FIG. 3. Similarly, duplicates of various other system components may be included in the memory system 310 such that one of the components may serve the memory system 310 responsive to a failure of another one of the components.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a processing device; and
a plurality of memory packages located on a same system board and coupled to the processing device;
wherein at least one of the plurality of memory packages is a replaceable unit that is, while power supplied to the other memory packages of the plurality located on the system board and the processing device is maintained, removable from the system board and replaceable with a different replaceable unit.

2. The system of claim 1, wherein the processing device is a replaceable unit that is, while power supplied to the plurality of memory packages is maintained, removable from the system and replaceable with a different replaceable unit.

3. The system of claim 1, wherein the processing device is capable of continuing, while one of the plurality of memory packages is being replaced with a corresponding replaceable unit, performing memory operations on a remaining one of the plurality of memory packages.

4. The system of claim 1, wherein the system comprises a plurality of power supplies, and wherein at least one of the plurality of power supplies is a replaceable unit.

5. The system of claim 4, wherein, responsive to one of the plurality of power supplies being replaced with a corresponding replaceable unit, a remaining one of the plurality of power supplies is configured to supply a power to the system.

6. The system of claim 1, wherein at least one of the plurality of memory packages comprises a plurality of memory dies comprising non-volatile memory cells.

7. The system of claim 6, wherein at least one of the plurality of memory dies comprises storage class memory (SCM).

8. The system of claim 1, wherein the system is a solid state drive (SSD).

9. A system, comprising:
a processing device; and
a plurality of system boards, each one of the plurality of system boards comprising a respective portion of a plurality of memory packages, wherein each of the plurality of memory packages is coupled to the processing device;
wherein at least one of the plurality of system boards, at least one of the plurality of memory packages located on a first system board of the plurality is a replaceable unit that is, while the processing device continues performing operations using at least one of the plurality of memory packages located on the first system board of the plurality, removable from the system and replaceable with a different replaceable unit.

10. The system of claim 9, wherein each one of the plurality of memory packages is a replaceable unit such that, subsequent to one or more of the plurality of memory packages is replaced with a corresponding replaceable unit, the system maintains a same number of memory packages despite the replacement.

11. The system of claim 9, wherein, when one of the plurality of system boards is replaced with a corresponding replaceable unit, at least one of the plurality of memory packages located on the one of the plurality of system boards is reusable on a remaining one of the plurality of system boards.

12. The system of claim 9, wherein, when one of the plurality of system boards is to be replaced with a corresponding replaceable unit, at least one of the plurality of memory packages located on the one of the plurality of system boards is reusable on the corresponding replaceable unit.

13. The system of claim 9, wherein each of the plurality of system boards is a replaceable unit, and the processing devices is configured to continue, responsive to one of the plurality of system boards being replaced with a corresponding replaceable unit, performing operations using a portion of the plurality of memory packages located on a remaining one of the plurality of system boards.

14. The system of claim 9, wherein the processing device is coupled to a host, and wherein the host is configured to provide a data protection scheme across the plurality of system boards such that data stored in one of the plurality of system boards replaced with a corresponding replaceable unit is restorable.

15. The system of claim 14, wherein the data protection scheme comprises a redundant array of independent disks (RAID), a redundant array of independent nodes (RAIN), or error correction coding (ECC), or combinations thereof.

16. A system, comprising:
a processing device; and
a plurality of memory packages located on a same system board and coupled to the processing device via a bus;
wherein at least one of the plurality of the memory packages is a replaceable unit that is, while maintaining data communication via the bus between the processing device and the other memory packages of the plurality located on the system board, removable from the system and replaceable with a different replaceable unit.

17. The system of claim 16, wherein the processing device is one of a plurality of processing devices included in the system.

18. The system of claim 17, wherein, responsive to one of the plurality of processing devices being replaced with a replaceable unit, a remaining one of the plurality of processing devices is configured to maintain data communication with the other memory packages of the plurality via the bus.

19. The system of claim 17, wherein the plurality of processing devices are coupled to each other via an inter-controller messaging bus.

20. The system of claim 16, wherein the bus is an ONFI compliant bus.

* * * * *